United States Patent [19]

Mallinson

[11] Patent Number: 5,714,278
[45] Date of Patent: Feb. 3, 1998

[54] EDGE-SEALED BATTERY SEPARATOR

[75] Inventor: Steven M. Mallinson, Pittsford, N.Y.

[73] Assignee: Valence Technology, Inc., Henderson, Nev.

[21] Appl. No.: 673,523

[22] Filed: Jul. 1, 1996

[51] Int. Cl.⁶ .................................................. H01M 2/18
[52] U.S. Cl. ..................... 429/126; 429/130; 429/145; 429/210; 29/623.3; 29/623.4
[58] Field of Search ............................ 429/124, 126, 429/127, 139, 144, 145, 162, 210, 190, 192; 29/623.3, 623.4

[56] References Cited

U.S. PATENT DOCUMENTS

| | | | |
|---|---|---|---|
| 3,216,863 | 11/1965 | Parker et al. | 429/145 |
| 3,694,268 | 9/1972 | Bergum | 29/623.3 |
| 4,119,770 | 10/1978 | Land | 429/162 |
| 5,089,027 | 2/1992 | Rossoll et al. | 29/623.2 |
| 5,350,645 | 9/1994 | Lake et al. | 29/623.4 |
| 5,521,023 | 5/1996 | Kejha et al. | 429/190 |
| 5,597,659 | 1/1997 | Morigaki et al. | 429/192 |
| 5,612,153 | 3/1997 | Moulton et al. | 429/126 |

*Primary Examiner*—Stephen Kalafut
*Assistant Examiner*—Carol Chaney
*Attorney, Agent, or Firm*—James Hsue

[57] ABSTRACT

The present invention concerns forming a masked area on a porous separator material for use in a battery. Masked areas can be formed on the porous separator material with heat and/or pressure. The use of a masked area allows for easier alignment of the anode and cathode sections, such that edge effects do not occur. Edge effects, which result from the electrode sections having different surface areas, can cause differential current densities at the corners and edges of the electrode sections. This inhomogeneous cycling of the anode and cathode can cause premature cycle fade of the battery. The edge effects can also include dendritic growth of a lithium anode. The mask separator section can be connected to a solid electrolyte and a cathode section to form an assembly. This assembly can be later combined with an anode assembly to form a battery cell.

19 Claims, 3 Drawing Sheets

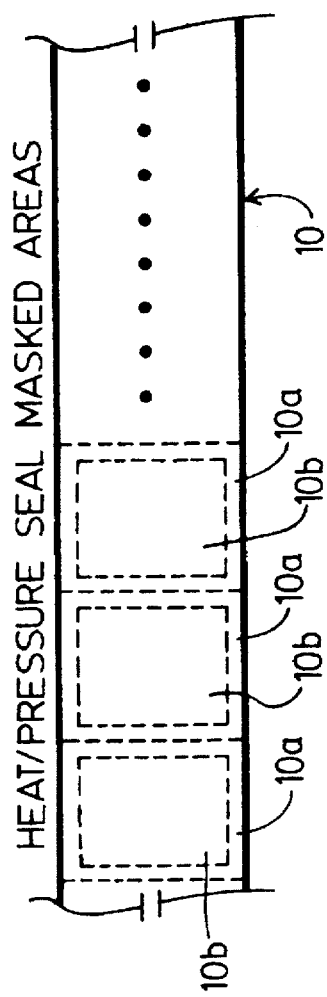
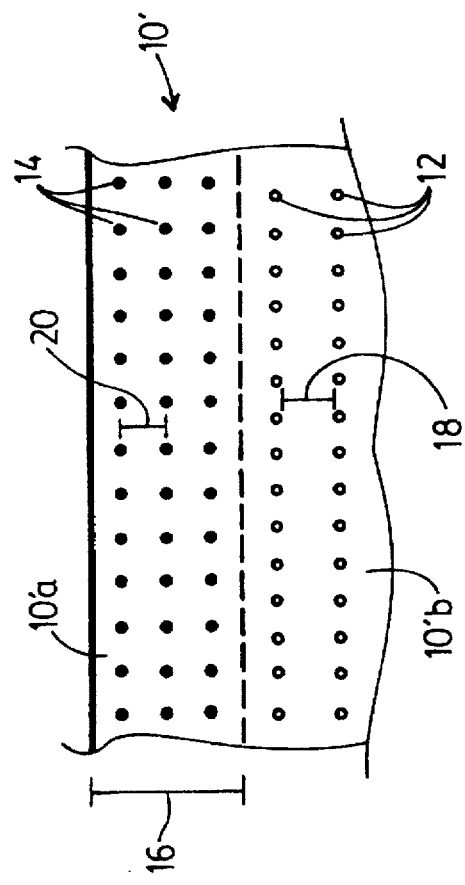

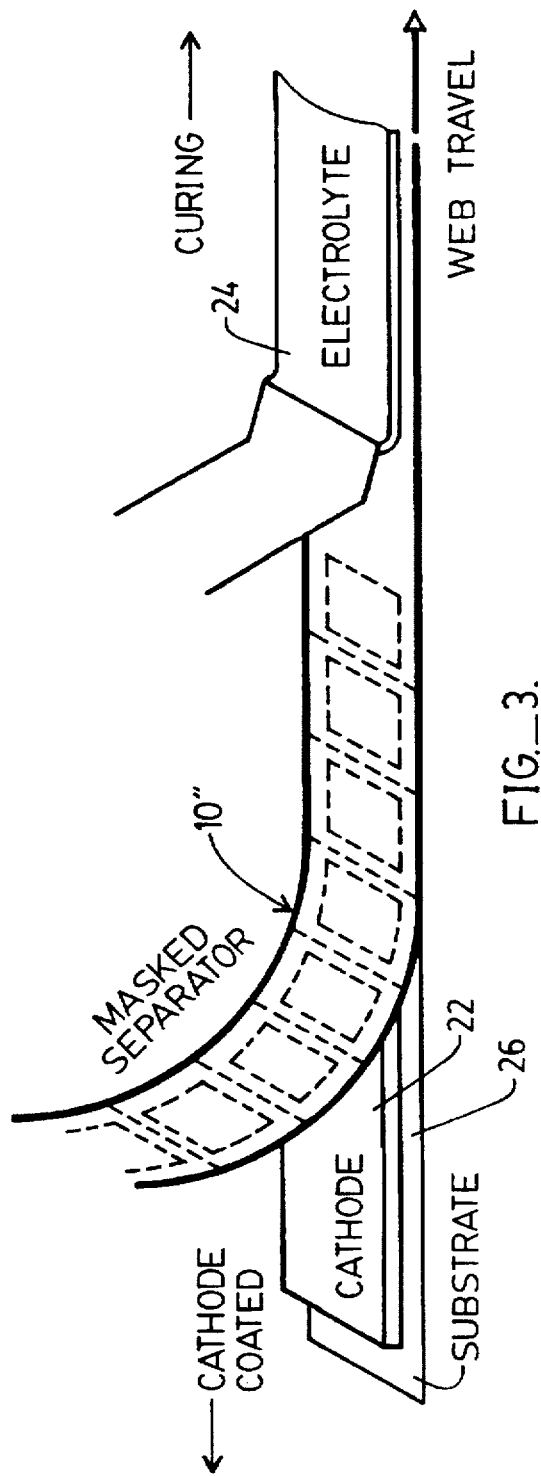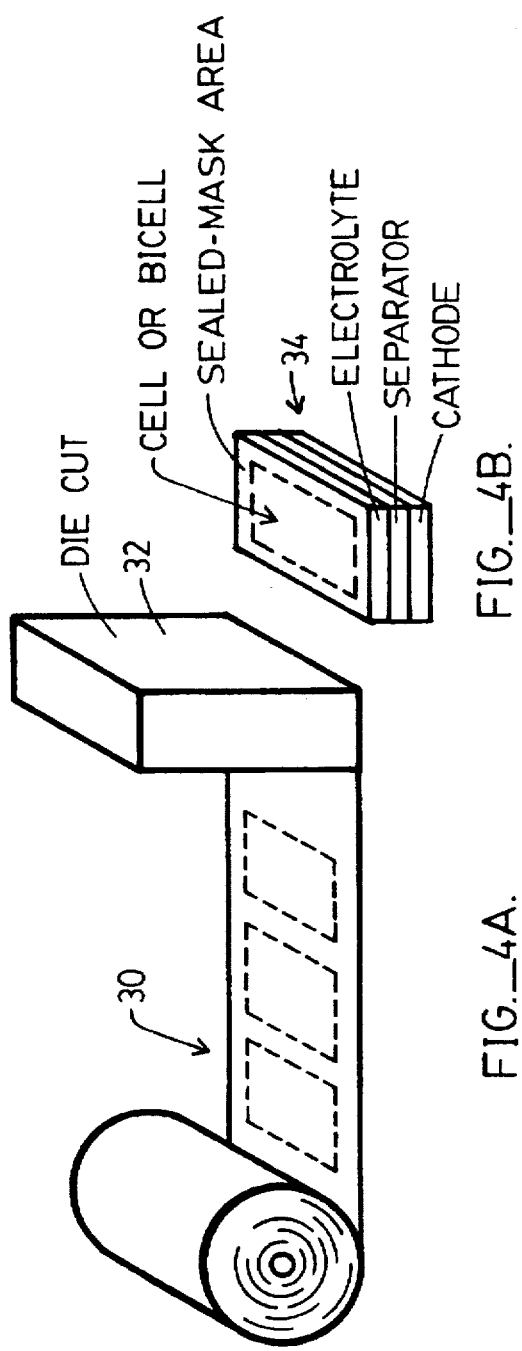

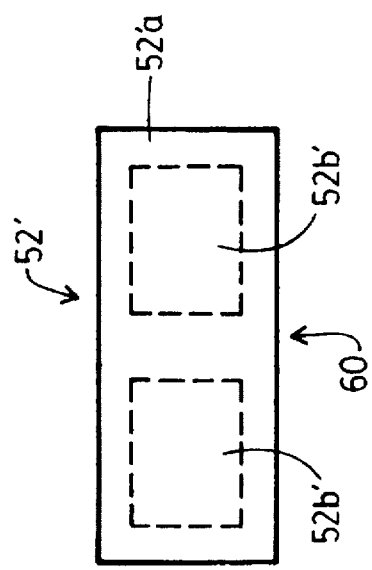
FIG._6.
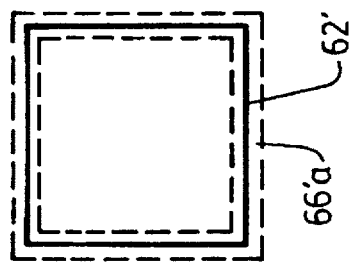
FIG._8.
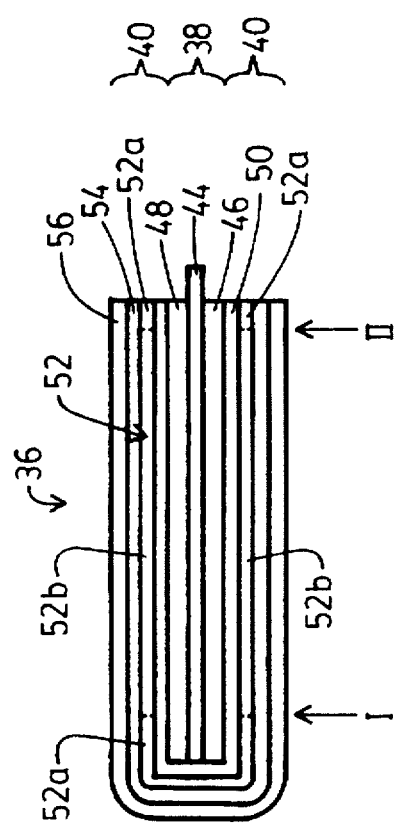
FIG._5.
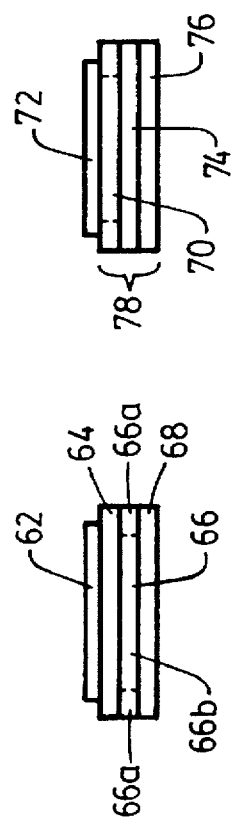
FIG._7B.
FIG._7A.

EDGE-SEALED BATTERY SEPARATOR

BACKGROUND OF THE INVENTION

This invention relates to a method and apparatus for forming a battery. More specifically, this application relates to the method and apparatus of forming laminar battery cells.

Laminar battery cells comprise solid electrode sections (anode and cathode sections) and solid electrolyte sections. The solid electrolyte material has an embedded liquid electrolyte material containing the free ions which transfer between the anode and cathode sections. These laminar battery cells can either be packaged alone or stacked together to form a larger battery.

SUMMARY OF THE INVENTION

A potential problem with laminar batteries is the differential current densities which may form at the corners and edges of these electrode sections. When the cathode section has a larger active surface area than the anode section, the density of the moving ions is greater at the edge of the anode than the center of the anode. Since the free ions move between locations on the electrodes that are closest to each other, the ions will tend to transfer between portions of the cathode surface and the edges of the anode. This means that the current density around the edges of the anode will be greater than the current density near the center of the anode.

Such inhomogeneous cycling of anode and/or cathode can cause premature "cycle-fade" of the battery. That is, the ability of the battery to be recharged may be reduced. Additionally, especially if a lithium anode is being used, there are safety issues that come into play due to the greater current density around the edges of the anode. Furthermore, the high current density near the edges of the anode can cause dendritic lithium growth at these edges.

Mylar masks have been used on the anodes to avoid these edge effects. These mylar masks are placed on the anode section. The area to be masked needs to be minimized to allow the largest active area available for cycling while still preventing dendritic growth at the edges. If mylar is used in a "picture frame" with edges $\leq \frac{1}{8}$" wide, the mylar frames do not have sufficient structure to be picked up and placed to maintain the desired masked off area. Inaccurate placement of the masks can result in further dendritic growth and a reduced cycle life.

The use of a porous separator material with masked edge sections is an improved way of avoiding the undesirable edge effects. The masked sections of the porous separator material can be better aligned with the active portions of the anode and the cathode. By laminating a web of porous separator material to the active layers, one can accurately position the masked edges since the masked edges structure is maintained by the "unmasked" center section. The mylar "picture frame", on the other hand, tends to be flimsy and hard to place since it has no support in its center.

The edge sections of the porous separator material are designed to be sufficient to mask the differences between the anode and cathode size, and thus reduce the edge effects. Typically, the cutting of the anode and cathode sections can cause these sections edges to curl up and possibly short together. The cathode sections are typically cut larger than the anode to avoid this shorting together and to ensure that all of the anode surface has a corresponding cathode surface. The masked section is positioned adjacent to at least one edge of the anode.

The masked sections of the porous separator can be formed by pressure or heat sealing the holes closed in portions of the porous separator material. The use of the masked sections on the porous separator material allows for machine alignment of these masked materials. The porous separator material with the masked sections can also be laminated as a strip with strips of the electrolyte and cathode materials and can then be stamped out to form an electrolyte/ separator/cathode assembly.

BRIEF DESCRIPTION OF THE DRAWINGS

The above and other features and aspects of the present invention will become more apparent upon the reading of the following detailed description in conjunction with the accompanying drawings, in which:

FIG. 1 is a diagram of a strip of porous separator material with masked edge sections;

FIG. 2 is a partial diagram of the porous separator material showing the closed and open holes;

FIG. 3 is a diagram showing the construction of the cathode/separator/electrolyte sections;

FIG. 4A is a diagram showing a strip of cathode separator/ electrolyte material being cut into assemblies;

FIG. 4B is a diagram of a cathode/separator/electrolyte assembly;

FIG. 5 is a cross-sectional view of a battery bi-cell showing the anode assembly and a cathode/separator/ electrolyte assembly;

FIG. 6 is a diagram that shows the masked area for a porous separator material used with a bi-cell;

FIG. 7A is a cross-sectional view of a battery cell showing the anode positioned over a cathode/separator/electrolyte assembly;

FIG. 7B is a diagram of an alternate embodiment of the battery of the present invention, in which the porous separator material is placed between the anode and the electrolyte; and FIG. 8 is a top view showing the positioning of the anode with respect to the edge portions of the porous separator material.

DETAILED DESCRIPTION OF THE PREFERRED EMBODIMENT

FIG. 1 is a diagram showing a strip of the masked separator material 10. Porous masked materials 10 are generally not used with solid electrolytes due to the separator materials' cost. The separator material 10 is made of polyethylene or polypropylene with holes distributed therethrough. The holes allow for the free ion transport through the separator material. An example of an appropriate separator material is the Celgard brand available from Holst Celanese. The masked separator material is ½ a mil thick.

The porous separator material is preferably heat- or pressure-sealable. This allows for masked end sections 10a to be formed on the porous separator material 10. The heat/pressure seals the holes in the masked areas 10a such that, when used in the battery cell, ion transport cannot occur in through the masked sections 10a. Other portions 10b are not heat/pressure sealed so that the areas 10b remain open. The masked areas 10a can be formed with a rotary disk heater. The porous separator material is guided under tension through the heated rollers. The heating rollers contain a pattern for the masked regions that is transferred to the strip of porous separator material. The strip of porous separator material under the tension control is aligned such that the correct masking pattern is formed on the porous separator material 10.

Another benefit of the porous separator material involves thermal shutdown. The holes in the remaining open section 10b of the porous separator material 10 will melt closed before the temperature of the porous separator material reaches about 180° C., the melting point of lithium. In this manner, the porous separator material 10 helps avoid thermal runaway of the battery.

FIG. 2 is a partial simplified diagram of a strip 10' showing the holes 12 and filled holes 14. Note that the width 16 of the masked area 10a' is greater than twice the average distance 18 between the holes in the center section 10b'. This distance 18 between the holes in the center section 10b' would be generally the same as the distance 20 between the filled holes 14 in the masked area 10a'. In the real porous separator material, the holes are very small and very close together such that the ions in the electrolyte are not impeded from transporting between the electrodes. In a preferred embodiment, the masked area 10a' is preferably less than about ⅛" thick in order to maximize the unmasked area between the electrodes. An alternate way of forming the masked area 10a other than heat or pressure sealing is to fill the holes in the masked area with a non-conductive material.

FIG. 3 is a diagram showing the lamination of the cathode 22, porous separator material 10", and electrode material 24. The discussion of the lamination process below is generally a modification of the lamination process described in Austin, et al. U.S. Pat. No. 4,997,732, which is incorporated herein by reference. The strips produced together in this lamination process are generally placed together using a "web" guidance system that controls the movement and lamination of strips of different materials. Cathode material 22 is coated onto a substrate 26, such as an aluminum current collector. The cathode is preferably a metal oxide conductive film or cross-linked acrylate for curing. The electrolyte material preferably comprises a conductive solvent containing lithium salt and acrylates for cross-linking. Materials for lithium/polymer batteries are described in Lee, et al. U.S. Pat. No. 4,830,939, which is incorporated herein by reference.

A strip of the masked separator material 10" is laminated on top of the cathode strip 22. This lamination can be done with rollers which produce enough pressure to attach the masked separator material to the cathode. Next, the electrolyte material 24 is laminated on top of the masked separator material. The laminated strip with the substrate 26, cathode 22, masked separator 10, and electrolyte 24 is then cured with electron beams. The "web guidance" system, such as Accuweb™, automatically aligns and laminates different strips on top of one another. The porous separator material 10" can be laminated to the electrodes since, unlike the mylar "picture frame", the porous separator material 10" has an "unmasked" portion to support the masked portion.

FIG. 4A is a diagram that shows the cutting of the cathode/separator/electrolyte strips. A strip of this material 30 is cut out with a die cut 32. As shown in FIG. 4D, this produces a cathode/separator/electrolyte assembly 34.

FIG. 5 is a cross-sectional view of the battery 36 showing anode section 38, along with cathode/separator/electrolyte assembly 40. The anode section 38 is preferably a lithium assembly comprised of a copper tab 44 surrounded by two pieces of lithium 46 and 48. This lithium assembly 38 is available from the Cyprus/Foote Mineral Company in Exton, Pa. The lithium assembly 38 is not easy to work with, so is preferably formed separately from the cathode/separator/electrolyte assembly 40. The cathode/separator/electrolyte assembly 40 comprises an electrolyte material 50, a porous separator material 52, a cathode material 54, and an aluminum current collector material 56. These layers wrap around the anode section 38 to form a bi-cell. The porous separator material 52 includes a masked area 52a and center areas 52b. The masked area 52a has had its holes closed such that ions in the electrolyte material cannot pass through these portions. The center areas 52b do have holes (not shown) in which the liquid electrolyte material embedded in the electrolyte layer 50 can pass through. Note that, if there was not a masked area 52a in the location to the left of position I, there would be a greater amount of cathode surface area than anode surface area in the area to the left of position I. This would cause the portions of the anode layer to the left of position I would to have a greater current density than the portions of the anodes to the right of position I. The areas of the anode and cathode material surfaces between the positions I and II are roughly the same. This area between positions I and II is the area in which the ions can pass through the center 52b of the porous separator material 52. In this manner, the edge effect including dendritic growth of the lithium, is avoided.

FIG. 6 is a diagram of the separator material 52' showing the masked region 52a'. The pattern of the masked area 52a' is suitable for use in a bi-cell. This pattern includes two center portions 52b'. The separator material 52' is formed into an assembly including cathode material, electrolyte and current collector, which is folded along position 60 around the anode assembly as shown in FIG. 5.

FIG. 7A is a cross-sectional view of a battery cell of the present invention, which shows an anode 62, electrolyte 64, separator material 66, and cathode 68. The separator material 66 includes masked regions 66a, and center regions 66b. This diagram shows another way that the masked separator material 66 can avoid the edge effects. The cutting of the anode and cathode sections can cause these sections edges to curl up and possibly short together. As discussed above, the cathode 68 is larger than the anode 62 to avoid the shorting which can be caused by the curled edges of the electrodes and so that all of the anode surface has a corresponding cathode surface. The masked regions 66a ensure that the active surface areas of the anode 62 and cathode 68 regions are about equal to avoid differential current densities at the edges.

FIG. 7B is a cross-sectional view of an alternate embodiment in which the separator material 70 is located directly next to the anode 72. This embodiment is less preferred than the embodiment shown in FIGS. 7A and 5, since the forming of assembly 78 comprising the separator 70, electrolyte 74, and cathode 76 does not ensure that the holes in the separator 70 are filled with the electrolyte liquid material. Another reason that the anode 72 would not normally contact the separator material 70 is that the Lithium anode would not normally be formed into an assembly with the separator and electrolyte due to the difficulties in handling lithium.

FIG. 8 is a top view showing the positioning of the anode section 62' over the two phantom lines defining the masked area 66a' of the porous separator material.

Various details of the implementation and method are merely illustrative of the invention. It will be understood that various changes of details may be within the scope of the invention, which is to be limited only by the appended claims.

What is claimed is:

1. A method of forming a battery comprising:

providing a porous separator material defining holes;

closing some of the holes of the porous separator material such that a masked portion of the separator material is formed wherein the closing step is such that others of the holes of the porous separator material are unclosed so that an unmasked portion is formed, the closing step being such that any passage of ions through the masked portion is restricted;

forming an ion path between an anode and a cathode layer by placing a solid electrolyte layer on the separator layer and allowing liquid electrolyte suspended in the solid electrolyte material to flow though at least some of the unclosed holes of the separator material; and positioning electrode layers on both sides of the separator material, at least one of the electrode layers being positioned directly above or below the masked portion of the separator material.

2. The method of claim 1, wherein the closing step comprises heat sealing the edge portion of the separator material.

3. The method of claim 1, wherein the closing step comprises pressure sealing the edge portion of the separator material.

4. The method of claim 1, wherein the closing step comprises filling the holes in the edge portion of the separator material with a non-electrolyte material.

5. The method of claim 1, wherein the ion path forming step further comprises connecting the separator to the cathode, and placing the solid electrolyte material onto the separator.

6. The method of claim 1, wherein the porous separator material is provided in an strip, and the closing step comprises sealing multiple mask areas on the strip, and wherein the ion path forming step comprises connecting the strip of separator material to the strip of cathode material, placing a strip of solid electrolyte material onto the separator strip, and stamping out a cell such that separator material has a masked portion at the edges of the cell.

7. The method of claim 6, further comprising connecting an anode to the other side of the solid electrolyte.

8. The method of claim 6, wherein the ion path forming step further comprises placing the cathode strip onto a current collector substrate.

9. The method of claim 1, wherein two cathode sections are combined with an anode section to form a bi-cell.

10. The method of claim 1, wherein the forming step includes laminating the porous separator material onto the cathode.

11. A battery comprising:

a first electrode;

a masked porous separator material contacting the first electrode, the masked porous separator material including a center section defining holes and edge area without holes, the edge area formed by closing some of the holes of a porous separator material so that the passage of ions through the edge area is restricted;

a solid electrolyte layer including a liquid electrolyte in suspension, the solid electrolyte layer contacting the masked porous separator material such that some of the liquid electrolyte fills at least some of the holes of the center of the masked porous separator material; and a second electrode contacting the solid electrolyte layer, wherein at least one of the electrodes is positioned directly above or below a part of the edge portion of the separator material.

12. The battery of claim 11, wherein the first electrode comprises an anode and wherein the second electrode comprises a cathode.

13. The battery of claim 12, wherein the cathode and anode connected to current collectors.

14. The battery of claim 12, wherein the cathode, masked porous separator material, solid electrolyte layer, and anode are part of a bi-cell, wherein the cathode, masked porous separator material, and solid electrolyte layer fold around the anode such that the solid electrolyte layer contacts the anode, and wherein the masked porous separator material including an additional center section defining holes surrounded by the edge area without holes.

15. The battery of claim 12, wherein the cathode, masked porous separator material, solid electrolyte layer, and anode are part of a bi-cell, wherein the bi-cell further comprises a second solid electrolyte layer including a liquid electrolyte in suspension, the first and second solid electrolyte layer contacting opposite major faces of the anode, a second masked separator material including a center section defining holes and edge area without holes, and another cathode layer.

16. The battery of claim 12, wherein the edge area of the masked porous separator material contacts an edge of the anode material.

17. The battery of claim 12, wherein the anode material comprises lithium.

18. The battery of claim 11, wherein the edge area of the masked porous separator material is less than about ⅛" thick.

19. The battery of claim 11, wherein the edge area has a width greater than twice the average distance between nearest adjacent holes in the center section.

* * * * *